United States Patent
Goobar et al.

(10) Patent No.: US 6,714,343 B2
(45) Date of Patent: Mar. 30, 2004

(54) POWER STABILIZATION IN AN OPTICAL COMMUNICATION SYSTEM

(75) Inventors: Edgard Goobar, Stockholm (SE); Johan Sandell, Enskede (SE); Sven Wingstrand, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/204,237

(22) PCT Filed: Feb. 20, 2001

(86) PCT No.: PCT/EP01/01916
§ 371 (c)(1),
(2), (4) Date: Oct. 8, 2002

(87) PCT Pub. No.: WO01/65736
PCT Pub. Date: Sep. 7, 2001

(65) Prior Publication Data
US 2003/0117696 A1 Jun. 26, 2003

(30) Foreign Application Priority Data
Mar. 2, 2000 (EP) .............................................. 00104308

(51) Int. Cl.[7] .................................................. H01S 3/00
(52) U.S. Cl. ..................................... 359/337; 359/341.4
(58) Field of Search .............................. 359/337, 341.4, 359/341.41, 341.42

(56) References Cited

U.S. PATENT DOCUMENTS

| 5,471,334 A | * | 11/1995 | Masuda et al. ............. 359/177 |
| 6,016,213 A | * | 1/2000 | Farber et al. ................ 359/177 |
| 6,226,117 B1 | * | 5/2001 | Hentschel .................... 359/337 |
| 6,570,703 B2 | * | 5/2003 | Murakami et al. ...... 359/344.42 |

FOREIGN PATENT DOCUMENTS

EP         1 085 683 A1     3/2001

\* cited by examiner

*Primary Examiner*—Mark Hellner

(57) ABSTRACT

The invention concerns a method and apparatus for determining noise power caused by amplified spontaneous emission in a signal output by an optical amplifier (100). The amplifier is connected downstream of further optical amplifiers or components that generates noise power due to amplified spontaneous emission (ASE). The amplifier is connected to a control channel and receives via this channel information about the proportion of ASE power contained in the amplifier input signal. The amplifier further includes a control unit for calculating the ASE power generated in the amplifier, for example using a predetermined relationship between the gain of an amplifier and the generated amplified spontaneous emission (ASE). The ASE power in the amplifier output signal is then determined as the sum of the generated ASE power and the power resulting from propagated ASE. The determined target output power can be used to stabilise the amplifier output.

13 Claims, 2 Drawing Sheets

POWER STABILIZATION IN AN OPTICAL COMMUNICATION SYSTEM

FIELD OF THE INVENTION

The invention is broadly directed to optical transmission systems that utilise optical amplifiers, and specifically to wavelength division multiplexed (WDM) systems. The invention has particular relevance to the control of output power of optical amplifiers in the presence of amplified spontaneous emission (ASE).

BACKGROUND ART

In any optical network it is important to maintain correct power levels for all traffic channels. This is generally achieved by monitoring the output power of optical amplifiers using a broadband optical detector, such as a photodetector. The monitored output power is then utilised in a feedback loop to adjust the amplifier gain so that the desired output is produced. The amplifier output power $P_{out}$ is then compared with a desired, or target, signal power $P_{out\_target}$. This target power $P_{out\_target}$ is the total power of all channels transmitted in the optical fibre. It can thus be expressed as $$P_{out\_target} = N_{ch} \times P_{ch\_target}$$

where $N_{ch}$ is the number of channels carried in the WDM link.

However, a characteristic of optical amplifiers, whether they are of the active fibre, semiconductor or solid state type, is amplified spontaneous emission (ASE) which manifests itself as a broadband signal at the amplifier output. For high input signal powers, the measurable ASE power at the output is negligible. However, at low signal powers, for example powers lower than about −20 dBm, the power due ASE is a significant proportion of the total measured output power. If the signal output power is corrected by adjusting the amplifier gain on the basis of the target power $P_{out\_target}$, the resultant channel output power will inevitably be lower than required.

It is known to utilise a narrow band detector at the output of the amplifier to measure the signal power at a limited range of wavelengths. This effectively filters out the ASE so that the monitored signal is a faithful copy of the output traffic power. Such a solution may be used in systems using a single carrier wavelength, such as time domain multiplexed (TDM) systems, however, it is not so effective for WDM systems where a large number of different wavelengths are used. Narrow band detection may be employed for one of the signal wavelengths present in the WDM system but is problematic for two reasons. Firstly, the system becomes inflexible, since the monitored signal must be routed through all the optical amplifiers in the network. Secondly, the system is inherently frail because any fault occurring in the monitored channel will result in the collapse of the whole network.

Co-pending European patent application No. 99118310.4 suggests a numerical method for determining the generated ASE power perceived at the output of an optical amplifier. In this method all input power is treated as traffic signal power. Thus while the method is effective for determining how much ASE power is added to the total power output by an optical amplifier, it does not allow stabilisation of the output traffic power in the presence of propagated ASE power, i.e. accumulated ASE power generated by upstream optical amplifiers and contained in the input signal.

SUMMARY OF INVENTION

It is an object of the present invention to provide an optical amplifier arrangement and a method which enables the traffic signal power in an output signal to be reliably monitored.

It is a further object of the present invention to provide an optical amplifier arrangement and a method with which the output power can be reliably stabilised.

It is yet a further object of the present invention to provide an arrangement and method for an optical communications link comprising multiple optical amplifiers with which the traffic power may be reliably monitored and/or stabilised.

In accordance with the present invention, an optical amplifier receives information concerning the amount of ASE noise power contained in the amplifier input. This information may be transmitted from an upstream amplifier, or other device that generates ASE, of from a network controller located at one or both ends of the link or at one or more nodes. The amplifier is further provided with a control unit for determining the ASE power generated within the amplifier. This is preferably achieved by using a stored relationship between generated ASE power and gain of the amplifier. The total ASE power at the output is a combination of the generated ASE power and the amplified received ASE power. The total ASE power is communicated to any optical amplifier arranged immediately downstream as a fraction of the total output power, so that the same calculation may be made. Once the amount of ASE noise power is known, the actual traffic power at the amplifier output can be deduced, and the amplifier gain may be adjusted to stabilise this output power.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
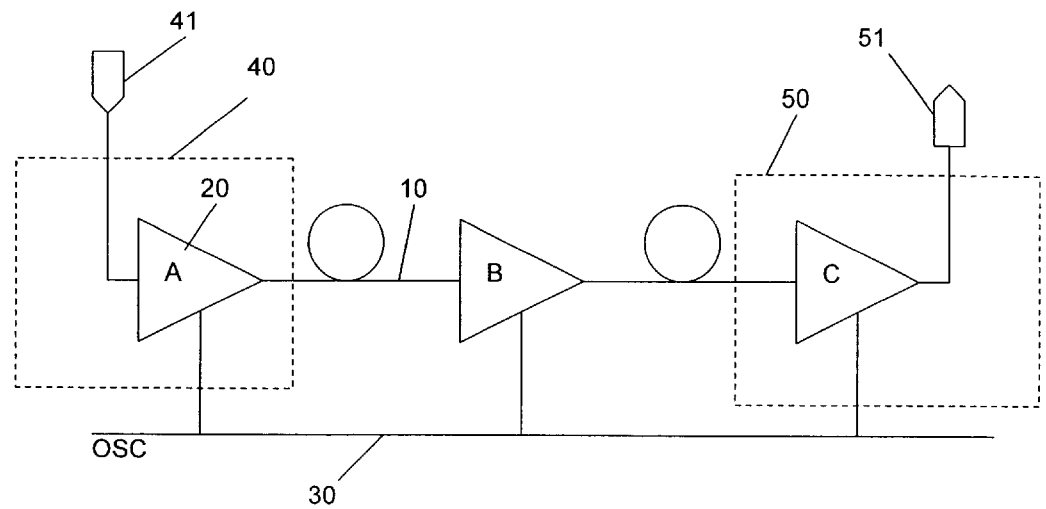
FIG. 1 schematically depicts an optical communications link with multiple amplifier stages.

FIG. 1 schematically illustrates a uni-directional link of a WDM communications network. In this link an optical fibre 10 is used to carry multiple traffic channels. Amplifier stages 20, three of which are shown in FIG. 1 for illustration and are denoted by A, B and C, are connected at intervals along the traffic fibre 10 for relaying traffic signals and maintaining the signal power at a desired level throughout the link. Amplifier A is arranged in a network node 40 and serves as a power amplifier connected to an input port 41 including a multiplexer (not shown). The amplifier B is a line amplifier and amplifier C is shown arranged in a separate network Lode 50 where it serves as a preamplifier connected to an output port 51 that includes a demultiplexer (not shown).

An optical supervisory channel (OSC) 30 for relaying control messages to and from the amplifiers 20 is further connected to all amplifier stages 20. The optical supervisory channel 30 preferably communicates with control circuitry (not shown) belonging to a network management system at one or both ends of the link, or at one or more nodes within the network. While this supervisory channel 30 is schematically illustrated as physically separate from the optical fibre 10, it will be understood that the channel 30 may equally well be carried on a separate optical or electrical cable or be carried by the fibre 10 together with the traffic data.

It is assumed that no optical amplifier stage is connected upstream of amplifier A. Thus power due to amplified spontaneous emission power will not be present in the input signal to this amplifier 20. The amplifier stage A 20 itself will generate amplified spontaneous emission so that a proportion of the output power emitted by this amplifier A 20 will be due to ASE.

In accordance with the method disclosed in co-pending patent application No. 99118310.4, which is incorporated herein by reference, the desired output power of this first optical amplifier stage 20 A includes the sum of desired output powers of all the traffic channels and the power due to ASE. The desired output power thus follows the relation:

$$P_{out\_target} = N_{ch} \times P_{ch\_target} + P_{ASE}(G) \qquad \text{Equ. 1}$$

Where $P_{out\_target}$ is the total desired output power of the optical amplifier, $N_{ch}$ is the number of traffic channels passed through the optical amplifier, $P_{ch\_target}$ is the desired output power for each individual channel and $P_{ASE}(G)$ is the ASE power generated by the optical amplifier at a specific gain G.

The method described in co-pending European patent application No. 99118310.4 utilises the observation that the ASE power generated by an optical amplifier is dependent on the gain of the amplifier to develop a numerical method and arrangement enabling the estimation of the ASE power generated by an optical amplifier at any gain. The method involves determining a model of the relation between generated ASE power and gain.

A simple model uses a linear relation between ASE power and amplifier gain, while a more complex model requires multiple measurements of ASE power at different gains. The ASE power generated at any one gain is determined on production of the amplifier using a test signal of narrow optical spectral width and high optical signal to noise ratio. A narrow band filter tuned to the test signal wavelength is connected to the amplifier output The test signal is passed through the amplifier and the power at the output of the narrow band filter is compared with the power at the output of a broadband filter that is likewise connected to the amplifier output. The narrow band signal power is equivalent to the test signal power. The broadband signal power includes the test signal power and any power due to ASE.

Each subsequent amplifier stage 20 connected in the link will generate additional ASE. However each stage will also receive and amplify accumulated ASE power generated by upstream amplifiers. In the case of these downstream amplifier stages B, C 20, therefore, the desired output power is equivalent to the total desired output power of all traffic channels plus the total ASE power. The total ASE power is equal to the ASE power generated in the amplifier itself and the propagated ASE power generated by upstream amplifiers, or possibly by other components that contribute to the ASE power. This is expressed in the equation below, where $P_{ASE\ TOTAL}(G)$ is the total ASE power output at the amplifier gain G. Thus $$P_{out\_target} = N_{ch} \times P_{ch\_target} + P_{ASE\ TOTAL}(G) \qquad \text{Equ. 2}$$

and $$P_{ASE\ TOTAL}(G) = P_{ASE}(G) + P_{ASE\ prop}(G) \qquad \text{Equ. 3}$$

where $P_{ASE}(G)$ is the ASE power generated at the amplifier stage 20 and $P_{ASE\ prop}(G)$ is the power at the amplifier output due to propagated ASE.

As discussed above with reference to co-pending European patent application No. 99118310.4, it is possible to determine the ASE power generated at an amplifier to a good approximation. In accordance with the present invention and as described below, each amplifier stage 20 is further capable of determining the amount of ASE power at the amplifier output that can be attributed to propagated ASE. Accordingly, with both values of ASE power making up the total ASE power, $P_{ASE\ TOTAL}(G)$, the gain of the amplifier can be adjusted to give the correct output power $P_{out\_target}$ to obtain the desired power for each traffic channel $P_{ch\_target}$ in accordance with Equ. 2 above.

The propagated ASE power is determined as follows. The first amplifier 20 in the amplifier chain, in this case amplifier A, determines the generated ASE power $P_{ASE\_A}(G)$ contained in the total output power at the gain utilised, for example using the method and possibly the arrangement described in co-pending European patent application No. 99118310.4. The gain, and therefore the generated ASE power, is preferably set to provide the desired target power for all traffic channels in accordance with Equ. 1. The value of ASE power is then expressed as a proportion $R_{ACC\ ASE\ A}$ of the total output power $P_{OUT\ A}$ in accordance with the following expression:

$$R_{ACC\ ASE\ A} = P_{ASE\_A}(G) / P_{OUT\ A} \qquad \text{Equ. 4}$$

Since no ASE power is propagated through amplifier A, the total ASE power contained in the amplifier output power is due to the generated ASE power $P_{ASE\_A}(G)$ The ASE proportional value $R_{ACC\ ASE\ A}$ is then transmitted to the following amplifier stage B in the link. This amplifier B utilises the value $R_{ACC\ ASE\ A}$ to calculate the total proportion of ASE power, $P_{ASE\ TOT\ B}$, contained in the amplifier output power in accordance with the following expression $$P_{ASE\ TOT\ B} = P_{ASE\_B}(G_B) + R_{ACC\ ASE\ A} \times P_{IN\ B} \times G_B \qquad \text{Equ. 5}$$

where $P_{ASE\_B}$ is the ASE power generated by amplifier B, $P_{IN\ B}$ is the total input power to amplifier B and $G_B$ is the gain of amplifier B. From equations 2 and 5, and with knowledge of the total input power, $P_{IN\ B}$, the required gain, $G_B$, for obtaining the desired channel power, $P_{ch\_target}$ can be determined and the amplifier pump power adjusted accordingly.

In addition, amplifier B determines the proportion $R_{ACC\ ASE\ B}$ of the amplifier output power $P_{OUT\ B}$ that is attributable to the accumulated ASE power, $P_{ASE\ TOT\ B}$ in accordance with the relation expressed in Equ. 4. This proportional value, $R_{ACC\ ASE\ B}$, is then transmitted to the next amplifier connected in the link, in this case amplifier C. Amplifier C then performs the same steps as amplifier B to determine the total ASE power contained in the output, calculate the required gain $G_C$ and the accumulated ASE proportion value $R_{ACC\ ASE\ C}$ and transmit this propagated ASE proportion value to a following amplifier, and/or possibly to the network management system.

The communication of the accumulated ASE proportion values $R_{ACC\ ASE}$ is preferably accomplished using the optical supervisory channel 30, or other suitable control channel. As discussed above the control channel 30 may be carried by the optical traffic fibre 10.

The first amplifier stage 20 in an amplifier chain may be configured on installation such that it determines only generated ASE power. Alternatively, it may receive information from the management system via the optical supervisory channel 30 or other suitable arrangement for relaying control messages. This information may specify the amplifier configuration, i.e. that it is the first amplifier in a chain of amplifiers, thus preventing the amplifier from calculating propagated ASE power. The information may instead take a similar format to the proportional ASE figure, and merely specify this proportion is zero.

Figure 2:
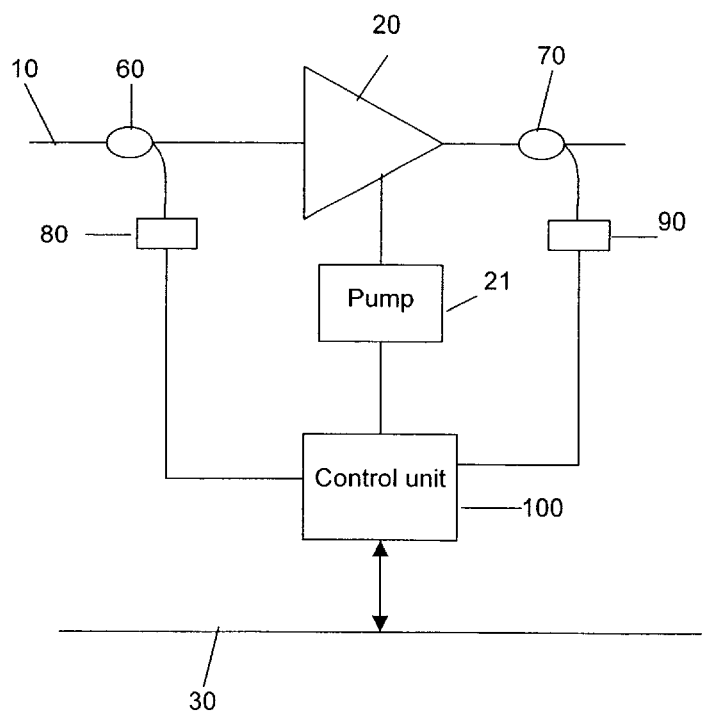
FIG. 2 schematically depicts a single amplifier stage in accordance with the present invention.

FIG. 2 schematically depicts an optical amplifier arrangement for determining the total ASE power carried over an optical link In the figure, an optical amplifier 20 is connected as a line amplifier in an optical fibre 10. A first optical coupler 60 is spliced to the fibre 10 at an input side of the amplifier 20 while a second optical coupler 70 is connected to the fibre 10 at the output of the amplifier 20. In the illustrated example the amplifier 20 is an active fibre amplifier that is driven in the conventional manner by one or several pump lasers 21. However, the amplifier 20 may equally be any class of optical amplifier that generates amplified spontaneous emission. For example it may comprise, but is not limited to, a rare earth doped fibre amplifier, an undoped fibre amplifier such as a Raman or Brillouin amplifier or a semiconductor laser amplifier. It will be understood, that when the amplifier 20 is a semiconductor laser amplifier, the pump laser 21 would be replaced by a current or voltage supply controlling the laser.

The optical couplers 60, 70 are selected to extract a small proportion of the transmitted signal power and typically have an extraction ratio of around 1:20. These couplers may be any suitable device capable of extracting a portion of the light signal carried in the optical fibre 10. An opto-electric converter 80, which may take the form of a photodetector, phototransistor, or any other suitable conversion device, is connected to the first optical coupler 60 and converts the extracted light signal into an electrical signal. A further opto-electric converter 90, similar to that connected to the amplifier input, is connected to the output of the second coupler 70. The extracted and converted input $P_{IN}$ and output signals $P_{OUT}$, which represent a measurement of the amplifier input and output powers, respectively, are fed to a control unit 100.

The control unit 100 is further connected to the optical supervisory channel 30 and receives via this channel the proportional $R_{ACC\ ASE}$ figure representing the ratio of ASE power to traffic signal power output by the immediate upstream amplifier. It is assumed that this ratio remains substantially constant over the fibre 10 connecting the amplifier 20 with the upstream amplifier. This figure $R_{ACC\ ASE}$ therefore represents the fraction of ASE power input into the amplifier 20. The unit 100 is also coupled to the amplifier pump 21 for controlling the amplifier gain by modifying the current or voltage signal controlling the pump laser. The control unit 100 preferably contains software controlled processing means, such as a microprocessor, microcomputer or the like, together with associated memory devices and possibly peripheral devices enabling monitoring of the amplifier operation. In addition to receiving and transmitting the proportional ASE figure, $R_{ACC\ ASE}$, the control unit 100 may also receive and transmit other information relative to the amplifier condition to the network management system via the optical supervisory channel 30.

Figure 3:
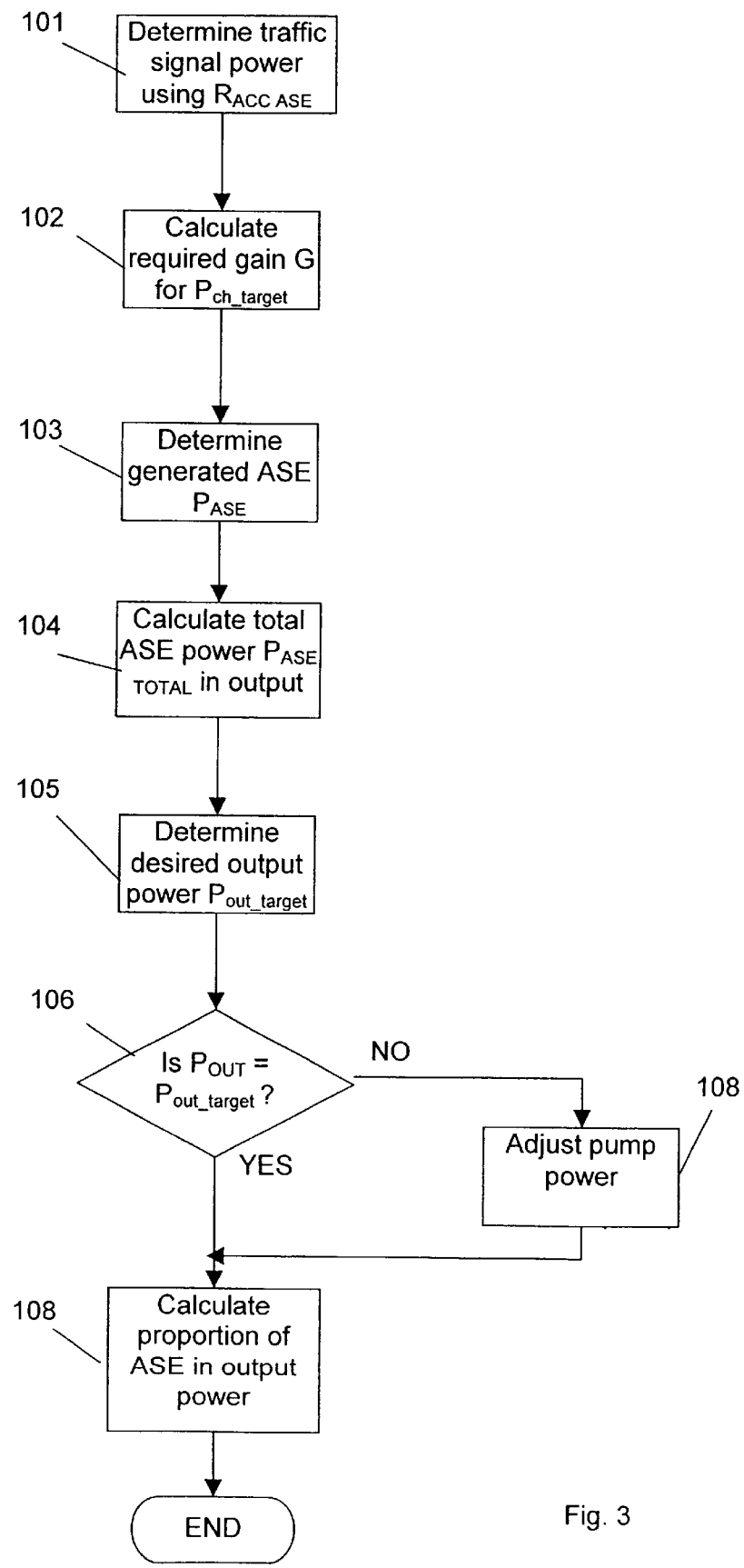
FIG. 3 is a flow diagram illustrating a gain stabilising procedure in accordance with the present invention.

The function performed by this control module is illustrated in a flow chart depicted in FIG. 3. This flow chart starts with step 101, in which the traffic power input into the amplifier 20 is determined using the proportional ASE figure $R_{ACC\ ASE}$ received from an upstream amplifier and the measured input power $P_{IN}$. The traffic input power calculated in this step effectively ignores other noise components, and assumes that all power not due to ASE is due to the N traffic channels. In step 102 the input traffic power is used to determine the amplifier gain required to obtain the sum of the target channel powers $N_{ch}P_{ch\_target}$. The required or desired traffic channel power $P_{ch\_target}$ may be a fixed quantity stored in the control unit 100 or in a component that is readily accessible to the control unit 100. Alternatively, the target power may be communicated to the amplifier, for example by the network management system, via the optical supervisory channel 30 or other control channel. The calculated value of gain G is then used in step 103 to determine the ASE power generated by the amplifier.

In accordance with the method and arrangement described in co-pending European Patent application No. 99118310.4, the ASE power can be determined either by calculation using a stored model of the relationship between gain and ASE power or by referring to a stored lookup table containing values of ASE power for multiple gain figures. The stored model or lookup table is preferably established on manufacture of the amplifier and may be specific to the amplifier or to a class of amplifiers.

In step 104, the total ASE power in the amplifier output signal is determined by summing the generated ASE power with the propagated ASE power in accordance with Equ. 5. The total required or target output power $P_{out\_target}$ is then calculated in step 105. In step 106, the real, measured output power of the amplifier $P_{OUT}$ is compared with the calculated target output power $P_{out\_target}$. If these are not equal the pump power of the amplifier pump 21 is adjusted until they are substantially equal. Finally, in step 108, the proportion of ASE power $R_{ACC\ ASE}$ contained in the amplifier output signal is calculated. This value is then ready for transmission to the optical amplifier located directly downstream of amplifier 20 for use in gain stabilisation. Preferably, this value is transmitted together with information identifying the sending amplifier, and/or the receiving amplifier. This proportional ASE figure may also be utilised by the network management system to monitor the operation of the network and also of individual amplifiers.

It will be understood that the amplifier gain need not be adjusted. Instead the network may be designed to tolerate a certain quantifiable drop in power. The arrangement and method described with reference to FIGS. 2 and 3 can then be used to provide information about the power of the traffic channels at any point along the optical communications link. In this case the real gain of the amplifier is calculated utilising the measured input and output powers.

What is claimed is:

1. An optical amplifier arrangement, including
   an optical amplifier disposed to receive optical input signals and emit amplified optical output signals,
   means (60, 80) for measuring the input power to the amplifier (20), characterised by
   means (30, 100) for receiving data representing the amount of ASE noise power in an input signal received by the amplifier (20), and
   means (100) responsive to said measured input power and said received data for determining the amount of ASE power generated in the amplifier and for calculating the total ASE noise power at the amplifier output.

2. An arrangement as claimed in claim 1, further characterised by means (100, 30) for determining the proportion of ASE noise power ($R_{ACC\ ASE}$) contained in the amplifier output power and for transmitting a control message containing this determined proportion.

3. An arrangement as claimed in claims 1 or 2, further characterised by means (70, 90) for measuring the output power of the amplifier (20) and means (100) for determining the amplifier gain.

4. An arrangement as claimed in claim 3, characterised by means (100) for determining a required output power of the amplifier (20) for a predetermined traffic output power, means (70, 90) for measuring the output power of the amplifier (20), and means (100, 21) for adjusting the amplifier gain when the measured output power is not substantially equal to the required output power.

5. An optical amplifier arrangement including an optical amplifier (20) coupled to on an optical transmission line for receiving optical input signals and emitting amplified optical output signals, means (60, 80) for measuring input power to the amplifier (20), means (70, 90) for measuring power output from the amplifier, characterised by means (30, 100) for receiving data representing the proportion of ASE noise power in the amplifier input, means responsive to said measured input power and said received data for determining the received traffic power, means for calculating the amplifier gain required to obtain a desired traffic output power, means (100) for determining the amount of ASE power generated at the calculated amplifier gain, means for determining the amount of amplified propagated ASE noise power contained in an output signal and means (100, 21) for comparing the measured amplifier output power with the sum of the desired traffic output power, the generated ASE power and the amplified propagated ASE noise power and for adjusting the amplifier gain if these are not substantially equal.

6. An optical link including an optical fibre (10) with at least two optical amplifiers (20) connected to said optical fibre and a control channel (30) arranged to carry control messages to and from said optical amplifiers, said link including means (60, 80) for detecting the input power to each amplifier, characterised by means (100) for receiving through said control channel (30) information concerning the amount of ASE noise power contained in the input to each amplifier, means (100) for determining ASE noise power generated in each amplifier and means (100) responsive to said measured input power and said received data for calculating the total ASE noise power at the output of each amplifier.

7. A link as claimed in claim 6, further characterised by means (100) for calculating the fraction of ASE noise power in the power output from each amplifier (20) and transmitting information concerning said calculated fraction on said control channel (30).

8. A link as claimed in claim 6 or 7, characterised in that said control channel (30) is carried on a cable that is physically separate from said optical fibre (10).

9. A method of determining the amount of noise power due to amplified spontaneous emission in a signal output by an optical amplifier, including: measuring the input power to the amplifier, receiving information concerning the proportion of propagated ASE noise power in a received signal, determining the amount of amplified propagated ASE power contained in the amplifier output signal determining ASE power generated by said amplifier, summing said generated ASE power and said amplified propagated ASE power to obtain the amount of noise power in the amplifier output signal.

10. A method as claimed in claim 9, characterised in that said generated ASE power is determined by measuring the output power of the amplifier, calculating the gain of the amplifier and determining the generated ASE power using a stored relation between ASE power and gain of the amplifier.

11. A method as claimed in claim 9, characterised in that said generated ASE power is determined by determining the traffic signal power in the amplifier input signal, calculating an amplifier gain required to obtain a desired traffic signal output and determining the generated ASE power using a stored relation between ASE power and gain of the amplifier.

12. A method as claimed in any one of claims 9 to 12, characterised by determining the ratio of ASE power to traffic signal power in the amplifier output signal and transmitting said ratio to at least an upstream optical amplifier.

13. A method of stabilising the output power of an optical amplifier in an optical communications link, including:

measuring the input power to the amplifier, receiving information concerning the proportion of propagated ASE noise power in a received signal, determining the received traffic power, determining amplifier gain for obtaining a desired traffic output power, determining ASE power generated at said gain, determining the amount of amplified propagated ASE noise power contained in an output signal, adjusting the real amplifier output power to be substantially equal to the sum of the desired traffic output power, the generated ASE power and the amplified propagated ASE noise power.

* * * * *